US011879071B2

(12) United States Patent
Cheng et al.

(10) Patent No.: US 11,879,071 B2
(45) Date of Patent: Jan. 23, 2024

(54) LOW-VISCOSITY THERMOSETTING STARCH ADHESIVE FOR PARTICLEBOARDS, AND PREPARATION METHOD THEREFORE

(71) Applicant: Jiangnan University, Wuxi (CN)

(72) Inventors: Li Cheng, Wuxi (CN); Junnan Jin, Wuxi (CN); Zhengbiao Gu, Wuxi (CN); Zhaofeng Li, Wuxi (CN); Yan Hong, Wuxi (CN); Caiming Li, Wuxi (CN); Xiaofeng Ban, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 18/209,032

(22) Filed: Jun. 13, 2023

(65) Prior Publication Data

US 2023/0323164 A1 Oct. 12, 2023

Related U.S. Application Data

(63) Continuation of application No. PCT/CN2022/117435, filed on Sep. 7, 2022.

(30) Foreign Application Priority Data

Dec. 24, 2021 (CN) ......................... 202111596651.8

(51) Int. Cl.

| | |
|---|---|
| ***C09J 103/02*** | (2006.01) |
| ***C09J 11/04*** | (2006.01) |
| ***C09J 11/06*** | (2006.01) |
| *B32B 7/12* | (2006.01) |
| *B32B 37/12* | (2006.01) |

(52) U.S. Cl.

CPC ............. *C09J 103/02* (2013.01); *C09J 11/04* (2013.01); *C09J 11/06* (2013.01); *B32B 7/12* (2013.01); *B32B 37/12* (2013.01); *C09J 2203/346* (2020.08); *C09J 2301/50* (2020.08)

(58) Field of Classification Search

CPC ........ C09J 103/02; C09J 103/04; C09J 11/04; C09J 11/06; C09J 2203/346; B32B 7/12; B32B 37/12

USPC ........................................ 156/325, 326, 336

See application file for complete search history.

(56) References Cited

U.S. PATENT DOCUMENTS

2018/0237547 A1* 8/2018 Veling .................... D21H 19/54

FOREIGN PATENT DOCUMENTS

| | | | |
|---|---|---|---|
| CN | 101195674 B | * | 6/2011 |
| CN | 107922803 A | | 4/2018 |
| CN | 111205794 A | | 5/2020 |
| CN | 111647112 A | | 9/2020 |
| CN | 114106749 A | | 3/2022 |
| JP | 2011057722 A | | 3/2011 |

OTHER PUBLICATIONS

English translation of CN 101195674B, Jun. 2011, Chen.*

Shi,Junyou et. al. "Research progress of biomass-based formaldehyde-free adhesives", Journal of Forestry Engineering, Mar. 20, 2018, 3(2):1-10.

* cited by examiner

*Primary Examiner* — Philip C Tucker
*Assistant Examiner* — Jimmy R Smith, Jr.
(74) *Attorney, Agent, or Firm* — IPRO, PLLC

(57) ABSTRACT

The present disclosure discloses a low-viscosity thermosetting starch adhesive for particleboards, and a preparation method therefore, belonging to the technical field of adhesive preparation. The adhesive of the present invention selects N-hydroxyethyl acrylamide or acetoxyethyl methacrylate as the crosslinking monomer, which has a low degree of crosslinking in the process of adhesive preparation to avoid the problem of increasing viscosity, but can crosslink quickly during the hot pressing process, forming a network structure, and improving the water resistance of the adhesive; and furthermore, itaconic acid is added to promote the self-crosslinking reaction of the crosslinking monomer in the hot-pressing process, thus further improving the water resistance. The properties of the manufactured particleboards reach the standard of P2 type particleboards, so that the adhesive can be suitable for mass production and can be widely applied in the preparation of wood decoration, particleboards, plywood and fiberboard.

8 Claims, No Drawings

LOW-VISCOSITY THERMOSETTING STARCH ADHESIVE FOR PARTICLEBOARDS, AND PREPARATION METHOD THEREFORE

TECHNICAL FIELD

The present disclosure discloses a low-viscosity thermosetting starch adhesive for particleboards, and a preparation method therefore, belonging to the technical field of adhesive preparation.

BACKGROUND

The current situation of insufficient supply of raw materials in wood industry has always restricted the development of wood-based panel industry. The effective way to solve this contradiction is to vigorously develop wood-based panels represented by particleboards and improve the comprehensive utilization rate of wood. At present, most of the wood-based panels on the market are produced by hot-pressing, which employs thermosetting adhesives such as urea formaldehyde resin (UF), phenol formaldehyde resin (PF) and melamine formaldehyde resin (MF). However, the above adhesive raw materials are not renewable, and a large amount of formaldehyde is released in the production and use processes of the above adhesive raw materials, resulting in environmental pollution and endangering public health. Therefore, it is necessary to develop an environment-friendly natural resource adhesive with good water resistance and good bonding performance.

Starch has the advantages of easy availability of raw materials, green environmental protection, low price, non-toxicity and harmlessness, zero formaldehyde, biodegradability, and the like, and is good in adhesive property, so that it is easy to use the starch to make an adhesive. Therefore, starch-based wood adhesives have become a major development trend today. At present, hot-pressed wood-based panels are widely applied, which greatly improves the production efficiency of the wood-based panels. Most of the wood-based panels are particleboards. An adhesive for particleboards needs to meet the requirements of low viscosity, initial adhesion, good water resistance, strong thermosetting property, and the like, but the conventional starch-based adhesives are high in viscosity, poor in water resistance and insufficient in thermosetting property. In view of the above requirements for the performance of adhesives, it has been reported in the prior art that a thermosetting starch adhesive for plywood has achieved ideal effects in storage stability, shear strength, water resistance and other aspects, and the viscosity of the starch adhesive may also be reduced by means of acid hydrolysis, but due to the self-crosslinking reaction of a crosslinking monomer, such as vinyl acetate or N-hydroxymethyl acrylamide, used in the reaction process, the viscosity of the adhesive increases sharply, which does not meet the use requirements of the particleboards; and furthermore, gelation may occur because the reaction is too violent. Therefore, it is necessary to solve the problem of the sharp increase in the viscosity of the starch adhesive during the reaction, and to improve the stability of the reaction.

SUMMARY

The present disclosure provides a thermosetting starch adhesive with low viscosity and good water resistance for particleboards, and a preparation method therefore. A crosslinking monomer which is low in crosslinking degree in an adhesive preparation process, but can be quickly crosslinked in a hot-pressing process is selected to avoid the problem of viscosity increase in an adhesive reaction process; the crosslinking monomer undergoes a self-crosslinking reaction in the hot-pressing process to form a three-dimensional network structure, which improves the water resistance of the adhesive; and furthermore, itaconic acid is added to promote the self-crosslinking reaction of the crosslinking monomer in the hot-pressing process, thus further improving the water resistance of the adhesive. The present disclosure has made a lot of research on the control of three key steps: acid hydrolysis concentration, crosslinking monomer addition amount, reaction temperature and mode, so that the viscosity does not rise sharply and the reaction is controllable in the reaction process, the situation of gelation will not occur, and the preparation process is more complete. The prepared starch adhesive for particleboards has the water resistance conforming to the standard required by P2 type particleboards, and meets the standard of Class II plywood. Compared with the prior art, the viscosity is reduced to 60 s (measured with 4 mm flow cup viscometer).

The reaction mechanism of the present disclosure is as follows: starch slurry with better fluidity is obtained by acid hydrolysis of starch, and the reaction efficiency is improved by drop wise addition of monomer, thereby improving thermosetting property to a certain extent. Grafting is carried out in the preparation process, and a crosslinking reaction occurs under hot-pressing to form the macromolecular network structure, which greatly improves the water resistance and bonding strength of the starch adhesive. The monomer that does not undergo the crosslinking reaction during the preparation process but only undergoes the crosslinking reaction during the hot-pressing process is grafted onto the starch, so that the viscosity of the adhesive does not increase in the reaction process, and the fluidity of the adhesive is guaranteed.

The present disclosure provides precise control for the following key control points:

① Pre-gelatinization temperature, the pre-gelatinization temperature shall not be lower than 80° C.; and if the pre-gelatinization temperature is too low and the pre-gelatinization effect is not complete, reaction sites exposed to starch will be too few, which will have a great impact on the subsequent graft copolymerization.

② The concentration of hydrochloric acid shall not exceed 1 mol/L; if the concentration of the hydrochloric acid is too high, the grafting efficiency will be reduced, resulting in the reduction of adhesive strength and water resistance; and if the concentration of the hydrochloric acid is too low, the starch adhesive will be too high in viscosity, which is not conducive to use.

③ The amount of a graft monomer added shall not exceed 6% of the amount of the starch; and too little graft monomer will make the water resistance of the adhesive insufficient, and too much graft monomer will have a little effect on improvement of dry strength and wet strength.

④ The amount of a crosslinking monomer added shall not be less than 10% of the amount of the starch; and too little crosslinking monomer will lead to the reduction of adhesive strength and water resistance.

⑤ The reaction temperature shall not be lower than 80° C.; if the reaction temperature is too low, the monomer reaction efficiency is not high, resulting in delamination of the adhesive; and if the reaction temperature is too high, the monomer is crosslinked, and the viscosity of the adhesive is increased.

The present disclosure provides a method for preparing a low-viscosity thermosetting starch adhesive for particleboards. The method is as follows:

| First, the formula of the starch adhesive for particleboards includes: (in parts by mass) | |
|---|---|
| starch | 100 parts |
| water | 150-400 parts |
| concentrated hydrochloric acid | 3-15 parts |
| a sodium hydroxide solution | 8-20 parts |
| a graft monomer | 2-8 parts |
| an initiator | 0.5-2 parts |
| an emulsifier | 1-3 parts |
| a crosslinking monomer | 5-15 parts |

where the graft monomer is itaconic acid; the crosslinking monomer is one or both of N-hydroxyethyl acrylamide and acetoxyethyl methacrylate; and the method specifically includes the following steps:

blending the starch and the water into starch slurry with a certain concentration, and stirring evenly; carrying out acid hydrolysis treatment, adjusting pH to carry out pre-gelatinization at 80-90° C. for 20 min-50 min; respectively preparing the graft monomer, the emulsifier and the initiator into solutions of certain concentrations, weighing a certain amount of the crosslinking monomer and a certain amount of the graft monomer and mixing evenly; adding the prepared emulsifier and initiator to the pre-gelatinized starch slurry, and dripping a mixed solution of the crosslinking monomer and the graft monomer at a uniform speed, where the drip time is 80-100 min; after the dropwise addition is completed, adding a reformulated initiator solution, and keeping the temperature for 80-100 min for a reaction, where the total reaction time is controlled within 4 h; and after the reaction, adjusting the pH to 5-7, cooling, evenly stirring and then discharging to obtain the low-viscosity starch adhesive.

In one embodiment of the present disclosure, the preparation method is as follows:

(1) blending the starch and the water into starch slurry with a mass ratio of 20-45% on a dry basis of starch, and stirring evenly;

(2) adjusting the temperature of the starch slurry to 50-75° C., adding hydrochloric acid diluted to 0.5-0.7 mol/L for acid hydrolysis for 1.5-3 h, and then adding the sodium hydroxide solution to adjust the pH of the starch slurry to 3-5;

(3) adjusting the temperature of the acid-hydrolyzed starch slurry to 80-90° C. at a rate of 1-2° C./min, and pre-gelatinizing for 20-50 min;

(4) taking the initiator that accounts for 50%-80% of the total mass of the initiator and adding water to prepare an initiator solution with a mass concentration of 1%-2%; taking the emulsifier and adding water to prepare an emulsifier solution with a mass concentration of 3%-7%; taking the graft monomer and adding water to prepare a solution with a mass concentration of 8%-12%, adding a certain amount of the crosslinking monomer and mixing evenly;

(5) directly adding the initiator solution and emulsifier solution prepared in step (4) into a reaction system obtained after pre-gelatinization in step (3), and dripping a mixed solution of the graft monomer and the crosslinking monomer into the reaction system obtained after pre-gelatinization in step (3) at a uniform speed within 80-100 min; after the dropwise addition is completed, adding a reformulated initiator solution, where the reformulated initiator solution is prepared by adding water to the remaining initiator that accounts for 30%-50% of the total mass of the initiator to formulate the initiator solution with a mass concentration of 1%-2%, and keeping the temperature for 80-100 min for a reaction; and (6) adjusting the pH of emulsion modified by grafting and crosslinking in step (5) to 5-7, and then cooling to 30-50° C. to obtain the starch adhesive.

In one embodiment of the present disclosure, the starch is any one or a combination of more of corn starch, waxy corn starch, tapioca starch, wheat starch, and crosslinked starch.

In one embodiment of the present disclosure, the concentrated hydrochloric acid is 12 mol/L concentrated hydrochloric acid.

In one embodiment of the present disclosure, the sodium hydroxide solution is a sodium hydroxide solution with a concentration of 10 mol/L.

In one embodiment of the present disclosure, the initiator is persulfate.

In one embodiment of the present disclosure, the emulsifier is any one or a combination of more of sodium dodecyl sulfate, sodium dodecylsulfonate, octylphenolpolyoxyethylene ether-10 (OP-10) and a phosphate ester emulsifier.

In one embodiment of the present disclosure, the crosslinking monomer is one or a mixture of more of N-hydroxyethyl acrylamide, acetoxyethyl methacrylate, and the like which have a low degree of self-crosslinking in a reaction process and can be crosslinked quickly in a hot-pressing process, and ensures that free formaldehyde will not be generated.

The present disclosure provides the low-viscosity thermosetting starch adhesive for particleboards, which is prepared by the above method.

The present disclosure provides a method for preparing the particleboards, plywood, fiberboard and wood decoration by using the low-viscosity thermosetting starch adhesive through hot-pressing.

In one embodiment of the present disclosure, the hot-pressing is performed after the adhesive and the wood shavings are evenly mixed and paved, the hot-press pressure is 3-11 Mpa, and the temperature is controlled at 150-180° C.

The present disclosure uses the new crosslinking monomer to solve the problem that the viscosity of the previous crosslinking monomer increases sharply due to crosslinking during a reaction, thus further reducing the viscosity of the starch adhesive to about 60 s (measured with 4 mm flow cup viscometer).

The properties of the particleboards prepared by using the starch adhesive in the present disclosure meet the requirements for GBT 4897-2015 P2 type particleboards, and the prepared particleboards can be soaked in water at 20° C. for 2 h without disintegration. Furthermore, the properties of the plywood prepared by using the starch adhesive in the present disclosure meet the requirements for GBT 9846-2015 Class II plywood, and the prepared plywood can be soaked in hot water at 63° C. for three hours without glue failure. Therefore, the application field of the starch adhesive is expanded.

The starch adhesive provided by the present disclosure is low in viscosity and good in fluidity, and the viscosity thereof is 30-70 s based on 4 mm flow cup viscometer. The crosslinking monomer that is low in degree of self-crosslinking in the adhesive preparation process (at the temperature of 70-90° C.) and can be quickly self-crosslinked to form a three-dimensional network structure in the hot-pressing process of the board (at the temperature of 130-180° C.) is screened out. The introduction of the graft monomer itaconic acid can promote the self-crosslinking of the crosslinking monomer N-hydroxyethyl acrylamide in the hot-pressing process. Therefore, the prepared particleboards have strong water resistance.

DETAILED DESCRIPTION

The present disclosure will be further illustrated below in conjunction with embodiments. It should be understood that these examples are only used for illustrative purposes and do not limit the protection scope of the present disclosure.

Viscosity Measurement Method:

In a room at a constant temperature of 25±1° C., a support platform was adjusted to keep a horizontal position, a test solution was stirred well and filtered in a sieve of not less than 567 holes/cm$^2$, and then the filtered test solution was kept at 25±1° C. The test solution was poured into a 4 mm flow cup viscometer, an outflow hole is plugged with fingers, and liquid to be measured was slowly poured into a cup until the liquid level protruded from an upper edge of the cup. If there were air bubbles, a clean flat glass plate was used to push horizontally along the edge once when the air bubbles floated to the surface so as to remove the protruding liquid level and air bubbles, so that the level of the liquid to be measured was on the same level with the upper edge of the flow cup. The test solution flowed out vertically when letting go of the fingers, and was accommodated in a holding cup; and at the same time, a stopwatch was started, the test solution flowed out into a line, the stopwatch was stopped when the flowing line was disconnected, and the measured time represented the viscosity, in seconds. For a second parallel test, the error shall not exceed 3% of an average value.

Examples 1 and 2 Demonstrate the Influence of Acid Hydrolysis on the Viscosity of the Adhesive

Example 1

| Formula (mass/g): | |
|---|---|
| corn starch | 100 |
| water | 300 |
| a 12 mol/L concentrated hydrochloric acid solution | 10 |
| a 10 mol/L sodium hydroxide solution | 17 |
| itaconic acid (a graft monomer) | 5 |
| ammonium persulfate (an initiator) | 0.81 |
| sodium dodecyl sulfate (an emulsifier) | 1.3 |
| N-hydroxyethyl acrylamide (a crosslinking monomer) | 15 |

Technological Process (1) the starch and the water were blended into starch slurry with a mass ratio of 35% on a dry basis of starch, and stirred evenly;

(2) the temperature of the starch slurry was adjusted to 60° C. at a rate of 2° C./min, 10 g of the 12 mol/L concentrated hydrochloric acid solution was diluted to 0.6 mol/L and then added into the starch slurry for acid hydrolysis, and the acid hydrolysis was carried out for 2 h; after that, the 10 mol/L sodium hydroxide solution was added to adjust pH to 4; the temperature of the acid-hydrolyzed starch slurry was adjusted to 85° C. at a rate of 1° C./min, and the reaction temperature was kept at 85° C. after pre-gelatinization for 30 min;

(3) 0.61 g of the initiator was dissolved in 35 g of water to prepare an initiator solution, 1.3 g of the emulsifier was dissolved in 24.8 g of water to prepare a 5% emulsifier solution, 5 g of the graft monomer itaconic acid was dissolved in 45 g of water to prepare a solution, and 15 g of the crosslinking monomer N-hydroxyethyl acrylamide was dissolved in the graft monomer solution;

(4) the initiator solution and emulsifier solution prepared in step (3) were directly added into a reaction system obtained after pre-gelatinization in step (2), and a mixed solution of the graft monomer and the crosslinking monomer was dripped into the reaction system obtained after pre-gelatinization in step (2) at a uniform speed within 100 min; after the dropwise addition was completed, 10 g of the initiator with a mass concentration of 2% was added, and keeping the temperature for 100 min for a reaction; and (5) the pH of emulsion modified by grafting and crosslinking in step (4) was adjusted to 6 with the 10 mol/L sodium hydroxide solution, and then the emulsion was cooled to 40° C., so that the starch adhesive was obtained.

The product obtained in this example had milky white and glossy appearance. The viscosity was measured with reference to the "viscosity measurement method" above, and the viscosity of the starch adhesive prepared in this example was 60 s.

Under the conditions of 180° C. and 11 Mpa, hot-pressing was carried out, and the thickness swelling of the obtained particleboard was measured to be 7.5% after 2 h of water absorption, which met the requirements of the national standard of 8%.

Under the conditions of 100° C. and 0.4 Mpa, hot-pressing was carried out to make three-layer plywood. The wet strength of the obtained three-layer plywood was 0.88 Mpa, which was greater than the national standard of 0.7 Mpa. (The wet strength was measured after the three-layer plywood was soaked in water at 63° C. for 3 h. If the glue failure occurred within 3 h, the wet strength was measured as 0. The relative wet strength is characterized by the time when glue failure occurs. The later the time when glue failure occurs, the better the water resistance).

Example 2

| Formula (mass/g): | |
|---|---|
| corn starch | 100 |
| water | 300 |
| a 10 mol/L concentrated hydrochloric acid solution | 2 |
| a 10 mol/L sodium hydroxide solution | 3 |
| itaconic acid (a graft monomer) | 5 |
| ammonium persulfate (an initiator) | 0.81 |
| sodium dodecyl sulfate (an emulsifier) | 1.3 |
| N-hydroxyethyl acrylamide (a crosslinking monomer) | 15 |

Technological Process (1) the starch and the water were blended into starch slurry with a mass ratio of 35% on a dry basis of starch, and stirred evenly;

(2) the temperature of the starch slurry was adjusted to 60° C. at a rate of 2° C./min, and was subjected to heat preservation for 2 h; then, the 10 mol/L concentrated hydrochloric acid solution was added to adjust pH to 4; the temperature of the starch slurry was adjusted to 85° C. at a rate of 1° C./min, and the reaction temperature was kept at 85° C. after pre-gelatinization for 30 min;

(3) 0.61 g of the initiator was dissolved in 35 g of water to prepare an initiator solution, 1.3 g of the emulsifier was dissolved in 24.8 g of water to prepare a 5% emulsifier solution, 5 g of the graft monomer itaconic acid was dissolved in 45 g of water to prepare a solution, and 15 g of the crosslinking monomer N-hydroxyethyl acrylamide was dissolved in the graft monomer solution;

(4) the initiator solution and emulsifier solution prepared in step (3) were directly added into a reaction system obtained after pre-gelatinization in step (2), and a mixed solution of the graft monomer and the crosslinking monomer was dripped into the reaction system obtained after pre-gelatinization in step (2) at a uniform speed within 100 min; after the dropwise addition was completed, 10 g of the initiator with a mass concentration of 2% was added, and keeping the temperature for 100 min for a reaction; and (5) the pH of emulsion modified by grafting and crosslinking in step (4) was adjusted to 6 with the 10 mol/L sodium hydroxide solution, and then the emulsion was cooled to 40° C., so that the starch adhesive was obtained.

The product obtained in this example had milky white appearance, was poorer in fluidity, and was close to a state of coagulation, so that the viscosity could not be measured by the above "viscosity measurement method".

Due to the high viscosity, sizing was difficult to realize, and it was impossible to mix the adhesive evenly, which could not meet the application requirements of particleboards and plywood.

The influence of acid hydrolysis on the viscosity of the adhesive is proved via the Examples 1 and 2. From the above data, the significance analysis shows that after acid hydrolysis, the viscosity of the prepared starch adhesive can meet the use requirements of the particleboards and the plywood, and the water resistance of the particleboards and plywood meets the requirements of the national standard, while the starch adhesive prepared without acid hydrolysis is too high in viscosity and cannot be used in the particleboards and the plywood, thus having no commercial value.

Examples 1 and 3 Demonstrate the Influence of Crosslinking Monomer on the Viscosity of the Adhesive Example 3

| Formula (mass/g): | |
|---|---|
| corn starch | 100 |
| water | 300 |
| a 12 mol/L concentrated hydrochloric acid solution | 10 |
| a 10 mol/L sodium hydroxide solution | 17 |
| itaconic acid (a graft monomer) | 5 |
| ammonium persulfate (an initiator) | 0.81 |
| sodium dodecyl sulfate (an emulsifier) | 1.3 |
| N-hydroxymethyl acrylamide (a crosslinking monomer) | 15 |

Technological Process (1) the starch and the water were blended into starch slurry with a mass ratio of 35% on a dry basis of starch, and stirred evenly;

(2) the temperature of the starch slurry was adjusted to 60° C. at a rate of 2° C./min, 10 g of the 12 mol/L concentrated hydrochloric acid solution was diluted to 0.6 mol/L and then added into the starch slurry for acid hydrolysis, and the acid hydrolysis was carried out for 2 h; after that, the 10 mol/L sodium hydroxide solution was added to adjust pH to 4; the temperature of the acid-hydrolyzed starch slurry was adjusted to 85° C. at a rate of 1° C./min, and the reaction temperature was kept at 85° C. after pre-gelatinization for 30 min;

(3) 0.61 g of the initiator was dissolved in 35 g of water to prepare an initiator solution, 1.3 g of the emulsifier was dissolved in 24.8 g of water to prepare a 5% emulsifier solution, 5 g of the graft monomer itaconic acid was dissolved in 45 g of water to prepare a solution, and 15 g of the crosslinking monomer N-hydroxymethyl acrylamide was dissolved in the graft monomer solution;

(4) the initiator solution and emulsifier solution prepared in step (3) were directly added into a reaction system obtained after pre-gelatinization in step (2), and a mixed solution of the graft monomer and the crosslinking monomer was dripped into the reaction system obtained after pre-gelatinization in step (2) at a uniform speed within 100 min; after the dropwise addition was completed, 10 g of the initiator with a mass concentration of 2% was added, and keeping the temperature for 100 min for a reaction; and (5) the pH of emulsion modified by grafting and crosslinking in step (4) was adjusted to 6 with the 10 mol/L sodium hydroxide solution, and then the emulsion was cooled to 40° C., so that the starch adhesive was obtained.

The product obtained in this example had milky white and glossy appearance, and was in a coagulated state, and the viscosity could not be measured.

Since the adhesive had been gelatinized, sizing could not be realized, which could not meet the application requirements of particleboards and plywood.

The influence of crosslinking monomer on the viscosity of the adhesive is proved via the Examples 1 and 3. From the above data, the significance analysis shows that the viscosity of the starch adhesive prepared by using the N-hydroxyethyl acrylamide and the itaconic acid can meet the application requirements of the particleboards and the plywood, and the water resistance of the particleboards and plywood meets the requirements of the national standard, while the starch adhesive prepared by using the N-hydroxymethyl acrylamide is too high in viscosity and cannot be applied in the particleboards and the plywood, thus having no commercial value.

Examples 1, 4 and 5 Demonstrate the Influence of Itaconic Acid on the Water Resistance of the Adhesive Example 4

| Formula (mass/g): | |
|---|---|
| corn starch | 100 |
| water | 300 |
| a 12 mol/L concentrated hydrochloric acid solution | 10 |
| a 10 mol/L sodium hydroxide solution | 17 |
| ammonium persulfate (an initiator) | 0.81 |
| sodium dodecyl sulfate (an emulsifier) | 1.3 |
| N-hydroxyethyl acrylamide (a crosslinking monomer) | 15 |

Technological Process (1) the starch and the water were blended into starch slurry with a mass ratio of 35% on a dry basis of starch, and stirred evenly;

(2) the temperature of the starch slurry was adjusted to 60° C. at a rate of 2° C./min, 10 g of the 12 mol/L concentrated hydrochloric acid solution was diluted to 0.6 mol/L and then added into the starch slurry for acid hydrolysis, and the acid hydrolysis was carried out for 2 h; after that, the 10 mol/L sodium hydroxide solution was added to adjust pH to 4; the temperature of the acid-hydrolyzed starch slurry was adjusted to 85° C. at a rate of 1° C./min, and the reaction temperature was kept at 85° C. after pre-gelatinization for 30 min;

(3) 0.61 g of the initiator was dissolved in 35 g of water to prepare an initiator solution, 1.3 g of the emulsifier was dissolved in 24.8 g of water to prepare a 5% emulsifier solution, and 15 g of the crosslinking monomer N-hydroxyethyl acrylamide was dissolved in 45 g of water;

(4) the initiator solution and emulsifier solution prepared in step (3) were directly added into a reaction system obtained after pre-gelatinization in step (2), and a crosslinking monomer solution was dripped into the reaction system obtained after pre-gelatinization in step (2) at a uniform speed within 100 min; after the dropwise addition was completed, 10 g of the initiator with a mass concentration of 2% was added, and keeping the temperature for 100 min for a reaction; and (5) the pH of emulsion modified by grafting and crosslinking in step (4) was adjusted to 6 with the 10 mol/L sodium hydroxide solution, and then the emulsion was cooled to 40° C., so that the starch adhesive was obtained.

The product obtained in this example had milky white and glossy appearance. The viscosity was measured with reference to the "viscosity measurement method" above, and the viscosity of the starch adhesive prepared in this example was 60 s.

Under the conditions of 180° C. and 11 Mpa, hot-pressing was carried out, and the thickness swelling of the obtained particleboard was measured to be 30% after 2 h of water absorption, which could not meet the requirements of the national standard of 8%.

Under the conditions of 100° C. and 0.4 Mpa, hot-pressing was carried out to make three-layer plywood. The wet strength of the obtained three-layer plywood was 0 Mpa, and glue failure occurred when the three-layer plywood was soaked in hot water at 63° C., which could not meet the national standard of 0.7 Mpa. (The wet strength was measured after the three-layer plywood was soaked in water at 63° C. for 3 h. If the glue failure occurred within 3 h, the wet strength was measured as 0. The relative wet strength is characterized by the time when glue failure occurs. The later the time when glue failure occurs, the better the water resistance).

Example 5

| Formula (mass/g): | |
|---|---|
| corn starch | 100 |
| water | 300 |
| a 12 mol/L concentrated hydrochloric acid solution | 10 |
| a 10 mol/L sodium hydroxide solution | 17 |
| acrylic acid (a graft monomer) | 5 |
| ammonium persulfate (an initiator) | 0.81 |
| sodium dodecyl sulfate (an emulsifier) | 1.3 |
| N-hydroxyethyl acrylamide (a crosslinking monomer) | 15 |

Technological Process (1) the starch and the water were blended into starch slurry with a mass ratio of 35% on a dry basis of starch, and stirred evenly;

(2) the temperature of the starch slurry was adjusted to 60° C. at a rate of 2° C./min, 10 g of the 12 mol/L concentrated hydrochloric acid solution was diluted to 0.6 mol/L and then added into the starch slurry for acid hydrolysis, and the acid hydrolysis was carried out for 2 h; after that, the 10 mol/L sodium hydroxide solution was added to adjust pH to 4; the temperature of the acid-hydrolyzed starch slurry was adjusted to 85° C. at a rate of 1° C./min, and the reaction temperature was kept at 85° C. after pre-gelatinization for 30 min;

(3) 0.61 g of the initiator was dissolved in 35 g of water to prepare an initiator solution, 1.3 g of the emulsifier was dissolved in 24.8 g of water to prepare a 5% emulsifier solution, 5 g of the graft monomer acrylic acid was dissolved in 45 g of water to prepare a solution, and 15 g of the crosslinking monomer N-hydroxyethyl acrylamide was dissolved in the graft monomer solution;

(4) the initiator solution and emulsifier solution prepared in step (3) were directly added into a reaction system obtained after pre-gelatinization in step (2), and a mixed solution of the graft monomer and the crosslinking monomer was dripped into the reaction system obtained after pre-gelatinization in step (2) at a uniform speed within 100 min; after the dropwise addition was completed, 10 g of the initiator with a mass concentration of 2% was added, and keeping the temperature for 80-100 min for a reaction; and (5) the pH of emulsion modified by grafting and crosslinking in step (4) was adjusted to 6 with the 10 mol/L sodium hydroxide solution, and then the emulsion was cooled to 40° C., so that the starch adhesive was obtained.

The product obtained in this example had milky white and glossy appearance. The viscosity was measured with reference to the "viscosity measurement method" above, and the viscosity of the starch adhesive prepared in this example was 60 s.

Under the conditions of 180° C. and 11 Mpa, hot-pressing was carried out, and the thickness swelling of the obtained particleboard was measured to be 25% after 2 h of water absorption, which could not meet the requirements of the national standard of 8%.

Under the conditions of 100° C. and 0.4 Mpa, hot-pressing was carried out to make three-layer plywood. The wet strength of the obtained three-layer plywood was 0 Mpa, and glue failure occurred when the three-layer plywood was soaked in hot water at 63° C., which could not meet the national standard of 0.7 Mpa. (The wet strength was measured after the three-layer plywood was soaked in water at 63° C. for 3 h. If the glue failure occurred within 3 h, the wet strength was measured as 0. The relative wet strength is characterized by the time when glue failure occurs. The later the time when glue failure occurs, the better the water resistance).

The influence of itaconic acid on the water resistance of the adhesive is proved via the Examples 1, 4 and 5. From the above data, the significance analysis shows that the water resistance of the particleboard and the plywood which are prepared by using the starch adhesive prepared by adding the itaconic acid reaches the national standard requirement, while the water resistance of particleboard and the plywood prepared by using a starch adhesive prepared without adding the itaconic acid or adding other graft monomers is not strong, which proves that the addition of the itaconic acid can improve the crosslinking degree of the N-hydroxyethyl acrylamide in the hot-pressing process, thus improving the water resistance of the starch adhesive.

Examples 1, 6 and 7 Demonstrate the Influence of Reaction Conditions on the Properties of the Adhesive

Example 6

| Formula (mass/g): | |
|---|---|
| corn starch | 100 |
| water | 300 |
| a 12 mol/L concentrated hydrochloric acid solution | 15 |
| a 10 mol/L sodium hydroxide solution | 20 |
| itaconic acid (a graft monomer) | 5 |
| ammonium persulfate (an initiator) | 0.81 |
| sodium dodecyl sulfate (an emulsifier) | 1.3 |
| N-hydroxyethyl acrylamide (a crosslinking monomer) | 15 |

Technological Process (1) the starch and the water were blended into starch slurry with a mass ratio of 35% on a dry basis of starch, and stirred evenly;

(2) the temperature of the starch slurry was adjusted to 60° C. at a rate of 2° C./min, 15 g of the 12 mol/L concentrated hydrochloric acid solution was diluted to 1 mol/L and then added into the starch slurry for acid hydrolysis, and the acid hydrolysis was carried out for 2 h; after that, the 10 mol/L sodium hydroxide solution was added to adjust pH to 4; the temperature of the acid-hydrolyzed starch slurry was adjusted to 85° C. at a rate of 1° C./min, and the reaction temperature was kept at 85° C. after pre-gelatinization for 30 min;

(3) 0.61 g of the initiator was dissolved in 35 g of water to prepare an initiator solution, 1.3 g of the emulsifier was dissolved in 24.8 g of water to prepare a 5% emulsifier solution, 5 g of the graft monomer itaconic acid was dissolved in 45 g of water to prepare a solution, and 15 g of the crosslinking monomer N-hydroxyethyl acrylamide was dissolved in the graft monomer solution;

(4) the initiator solution and emulsifier solution prepared in step (3) were directly added into a reaction system obtained after pre-gelatinization in step (2), and a mixed solution of the graft monomer and the crosslinking monomer was dripped into the reaction system obtained after pre-gelatinization in step (2) at a uniform speed within 100 min; after the dropwise addition was completed, 10 g of the initiator with a mass concentration of 2% was added, and keeping the temperature for 80-100 min for a reaction; and (5) the pH of emulsion modified by grafting and crosslinking in step (4) was adjusted to 6, and then the emulsion was cooled to 40° C., so that the starch adhesive was obtained.

The product obtained in this example had milky white and glossy appearance. The viscosity was measured with reference to the "viscosity measurement method" above, and the viscosity of the starch adhesive prepared in this example was 20 s. A phenomenon of delamination occurs after the starch adhesive stands still for a period of time, so that the starch adhesive has no application value.

Example 7

| Formula (mass/g): | |
|---|---|
| corn starch | 100 |
| water | 300 |
| a 12 mol/L concentrated hydrochloric acid solution | 10 |
| a 10 mol/L sodium hydroxide solution | 17 |
| itaconic acid (a graft monomer) | 5 |
| ammonium persulfate (an initiator) | 0.81 |
| sodium dodecyl sulfate (an emulsifier) | 1.3 |
| N-hydroxyethyl acrylamide (a crosslinking monomer) | 15 |

Technological Process (1) the starch and the water were blended into starch slurry with a mass ratio of 35% on a dry basis of starch, and stirred evenly;

(2) the temperature of the starch slurry was adjusted to 60° C. at a rate of 2° C./min, 10 g of the 12 mol/L concentrated hydrochloric acid solution was diluted to 0.6 mol/L and then added into the starch slurry for acid hydrolysis, and the acid hydrolysis was carried out for 2 h; after that, the 10 mol/L sodium hydroxide solution was added to adjust pH to 4; the temperature of the acid-hydrolyzed starch slurry was adjusted to 85° C. at a rate of 1° C./min, and the starch slurry was cooled to 75° C. after pre-gelatinization for 30 min;

(3) 0.61 g of the initiator was dissolved in 35 g of water to prepare an initiator solution, 1.3 g of the emulsifier was dissolved in 24.8 g of water to prepare a 5% emulsifier solution, 5 g of the graft monomer itaconic acid was dissolved in 45 g of water to prepare a solution, and 15 g of the crosslinking monomer N-hydroxyethyl acrylamide was dissolved in the graft monomer solution;

(4) the initiator solution and emulsifier solution prepared in step (3) were directly added into a reaction system obtained after pre-gelatinization in step (2), and a mixed solution of the graft monomer and the crosslinking monomer was dripped into the reaction system obtained after pre-gelatinization in step (2) at a uniform speed within 100 min; after the dropwise addition was completed, 10 g of the initiator with a mass concentration of 2% was added, and keeping the temperature for 80-100 min for a reaction; and (5) the pH of emulsion modified by grafting and cross-linking in step (4) was adjusted to 6, and then the emulsion was cooled to 40° C., so that the starch adhesive was obtained.

A phenomenon of delamination occurs after the product obtained in this example stands still for a period of time, so that the product is unfavorable for preservation and has no commercial value.

The influence of the reaction conditions on the properties of the adhesive is proved via the Examples 1, 6 and 7. From the above data, the significance analysis shows that too high concentration of hydrochloric acid will lead to too low viscosity, which is not conducive to the occurrence of a grafting reaction, and will also lead to delamination of the adhesive. If the reaction temperature is too low, the reaction of the monomer will be affected, resulting in the delamination of the adhesive. Therefore, the optimal reaction conditions are that the concentration of the hydrochloric acid is 0.6 mol/L, and the reaction temperature is 85° C.

Example 8

| Formula (mass/g): | |
|---|---|
| corn starch | 100 |
| water | 320 |
| a 12 mol/L concentrated hydrochloric acid solution | 12 |
| a 10 mol/L sodium hydroxide solution | 19 |
| itaconic acid (a graft monomer) | 6 |
| ammonium persulfate (an initiator) | 0.81 |
| sodium dodecyl sulfate (an emulsifier) | 1.3 |
| acetoxyethyl methacrylate (a crosslinking monomer) | 10 |

Technological Process (1) the starch and the water were blended into starch slurry with a mass ratio of 30% on a dry basis of starch, and stirred evenly;

(2) the temperature of the starch slurry was adjusted to 60° C. at a rate of 2° C./min, 12 g of the 12 mol/L concentrated hydrochloric acid solution was diluted to 0.7 mol/L and then added into the starch slurry for acid hydrolysis, and the acid hydrolysis was carried out for 2.5 h; after that, the 10 mol/L sodium hydroxide solution was added to adjust pH to 4.5; the temperature of the acid-hydrolyzed starch slurry was adjusted to 80° C. at a rate of 1° C./min, and the reaction temperature was maintained at 80° C. after pre-gelatinization for 40 min;

(3) 0.61 g of the initiator was dissolved in 35 g of water to prepare an initiator solution, 1.3 g of the emulsifier was dissolved in 24.8 g of water to prepare a 5% emulsifier solution, 6 g of the graft monomer itaconic acid was dissolved in 50 g of water to prepare a solution, and 10 g of the crosslinking monomer acetoxyethylmethacrylate was dissolved in the graft monomer solution;

(4) the initiator solution and emulsifier solution prepared in step (3) were directly added into a reaction system obtained after pre-gelatinization in step (2), and a mixed solution of the graft monomer and the crosslinking monomer was dripped into the reaction system obtained after pre-gelatinization in step (2) at a uniform speed within 100 min; after the dropwise addition was completed, 10 g of the initiator with a mass concentration of 2% was added, and keeping the temperature for 80-100 min for a reaction; and (5) the pH of emulsion modified by grafting and cross-linking in step (4) was adjusted to 6 with the 10 mol/L sodium hydroxide solution, and then the emulsion was cooled to 40° C., so that the starch adhesive was obtained.

The product obtained in this example had milky white and glossy appearance. The viscosity was measured with reference to the "viscosity measurement method" above, and the viscosity of the starch adhesive prepared in this example was 40 s.

Under the conditions of 180° C. and 11 Mpa, hot-pressing was carried out, and the thickness swelling of the obtained particleboard was measured to be 8% after 2 h of water absorption, which met the requirements of the national standard of 8%.

Under the conditions of 100° C. and 0.4 Mpa, hot-pressing was carried out to make three-layer plywood. The wet strength of the obtained three-layer plywood was 0.75 Mpa, which was greater than the national standard of 0.7 Mpa. (The wet strength was measured after the three-layer plywood was soaked in water at 63° C. for 3 h. If the glue failure occurred within 3 h, the wet strength was measured as 0. The relative wet strength is characterized by the time when glue failure occurs. The later the time when glue failure occurs, the better the water resistance).

Compared with the Patented Technology CN111592842A-High Starch Content Thermosetting Starch Adhesive for Wood-Based Panels and Preparation Method Therefore, Example 1 Demonstrates that the Present Patent is More Widely Used and has Stronger Applicability.

A preparation process of CN111592842A-High Starch Content Thermosetting Starch Adhesive for Wood-based Panels and Preparation Method Therefore is as follows:

| Formula (mass/g): | |
|---|---|
| corn starch | 100 |
| water | 300-350 |
| a 12 mol/L concentrated hydrochloric acid solution | 8.6 |
| a 10 mol/L sodium hydroxide solution | 10 |
| vinyl acetate (a graft monomer) | 6 |
| ammonium persulfate (an initiator) | 0.81 |
| sodium dodecyl sulfate (an emulsifier) | 1.3 |
| N-hydroxymethyl acrylamide (a crosslinking monomer) | 5.4 |

Technological Process (1) the starch and the water were blended into starch slurry with a mass ratio of 35% on a dry basis of starch, and stirred evenly;

(2) the starch slurry obtained in step (1) was heated at a rate of 2° C./min, heat preservation was performed for 10 min when temperature reaches 50° C., and the starch slurry was further heated up to 70° C.; 8.6 g of the 12 mol/L concentrated hydrochloric acid solution was diluted to 0.5 mol/L and then added into the starch slurry for acid hydrolysis, and the acid hydrolysis was carried out for 2.5 h; after that, the 10 mol/L sodium hydroxide solution was added to adjust pH to 4; the temperature of the acid-hydrolyzed starch slurry was adjusted to 80° C. at a rate of 1° C./min, and pre-gelatinization was carried out for 30 min;

(3) 0.51 g of the initiator was dissolved in 40 g of water to prepare an initiator solution, and the initiator solution accounting for 15% of the total mass of the initiator solution was mixed with the emulsifier and the graft monomer to prepare seed emulsion; after the system in step (2) was cooled to 70° C. at the rate of 1° C./min, the seed emulsion was dripped into the reaction system obtained after the pre-gelatinization in step (2) at a uniform rate within 20 min;

(4) after 10 min of preliminary grafting was completed, the remaining initiator solution was added immediately for further grafting; after 20 min, a crosslinking monomer solution with a mass concentration of 10% was added dropwise at a uniform rate within 2 h, and 30 g of the initiator with a mass concentration of 1% was added within 1 h after the dropwise addition of the crosslinking monomer; and (5) the emulsion modified by grafting and crosslinking in step (4) was heated up to 85° C., heat preservation was performed for 0.5 h to remove residual monomers, and the emulsion was cooled to 40° C. to obtain the starch adhesive.

The product obtained in this example had milky white and glossy appearance. The viscosity was measured with reference to the "viscosity measurement method" above, and the viscosity of the starch adhesive prepared in this example was 200 s. The starch adhesive can be applied to the preparation of plywood, and can meet the requirements for water resistance of the plywood, but since the viscosity is too high, the starch adhesive cannot meet the application requirements of particleboards. The adhesive prepared in Example 1 of the present disclosure can be applied to both the plywood and the particleboards, and the water resistance of the plywood and the particleboards can reach the national standard, which proves that the patent of the present disclosure is more widely used and has stronger applicability.

Although the present disclosure is disclosed above with preferred examples, it is not intended to limit the present disclosure. Anyone familiar with this technology can make various changes and modifications without departing from the spirit and scope of the present disclosure. Therefore, the scope of protection of the present disclosure shall be subject to those defined in the Claims.

What is claimed is:

1. A method for preparing a low-viscosity thermosetting starch adhesive for particleboards, wherein the composition of the starch adhesive for particleboards comprises: (in parts by mass) 100 parts starch, 150-400 parts water, 3-15 parts concentrated hydrochloric acid, 8-20 parts sodium hydroxide solution, 2-8 parts graft monomer, 0.5-2 parts initiator, 1-3 parts emulsifier, and 5-15 parts crosslinking monomer;

wherein the graft monomer is itaconic acid; the crosslinking monomer is one or both of N-hydroxyethyl acrylamide and acetoxyethyl methacrylate; and the method comprises the following steps:

(1) blending the starch and water into starch slurry with a mass ratio of 20-45% on a dry basis of starch, and stirring evenly;

(2) adjusting the temperature of the starch slurry to 50-75° C., adding 0.5-0.7 mol/L hydrochloric acid for acid hydrolysis for 1.5-3 hours, and then adding the sodium hydroxide solution to adjust the pH of the starch slurry to 3-5;

(3) adjusting the temperature of the acid-hydrolyzed starch slurry to 80-90° C. at a rate of 1-2° C./minutes, and pre-gelatinizing for 20-50 minutes;

(4) taking the initiator that accounts for 50%-80% of the total mass of the initiator and adding water to prepare an initiator solution with a mass concentration of 1%-2%; taking the emulsifier and adding water to prepare an emulsifier solution with a mass concentration of 3%-7% emulsifier; taking the graft monomer and adding water to prepare a solution of 8%-12% graft monomer in the emulsifier solution, adding the crosslinking monomer and mixing evenly;

(5) directly adding the initiator solution and emulsifier solution prepared in step (4) into a starch reaction system obtained after the pre-gelatinization in step (3), and dripping a mixed solution of the graft monomer and the crosslinking monomer into the starch reaction system obtained after pre-gelatinization in step (3) at a uniform speed within 80-100 minutes; after the dropwise addition is completed, adding a reformulated initiator solution to form a mixture and keeping the temperature of the mixture at 80-90° C. for 80-100 minutes to form a modified emulsion, wherein the reformulated initiator solution is prepared by adding water to the remaining initiator not used in step (4) to provide a mass concentration of 1%-2% initiator; and (6) adjusting the pH of the modified emulsion and then cooling the modified emulsion to 30-50° C. to obtain the starch adhesive.

2. The preparation method according to claim 1, wherein the starch is corn starch, waxy corn starch, tapioca starch, wheat starch, crosslinked starch, or a combination thereof.

3. The preparation method according to claim 1, wherein the initiator is persulfate.

4. The preparation method according to claim 1, wherein the emulsifier is sodium dodecyl sulfate, sodium dodecyl sulfonate, octylphenol polyoxyethylene ether-10 (OP-10), a phosphate ester emulsifier, or a combination thereof.

5. The preparation method according to claim 1, wherein the concentrated hydrochloric acid is 12 mol/L concentrated hydrochloric acid, and the sodium hydroxide solution is a sodium hydroxide solution with a concentration of 10 mol/L.

6. The low-viscosity thermosetting starch adhesive for particleboards, which is prepared by the preparation method according to claim 1.

7. A method for preparing particleboards, plywood, fiberboard or a wood decoration by using the low-viscosity thermosetting starch adhesive according to claim 6, comprising performing hot-pressing.

8. The method according to claim 7, wherein the hot-pressing is performed after the low-viscosity thermosetting starch adhesive and wood shavings are evenly mixed and paved, the hot-pressing pressure is 3-11 Mpa, and the temperature of the hot-pressing is controlled at 150-180° C.

* * * * *